United States Patent [19]

Ishibashi et al.

[11] Patent Number: 5,963,286
[45] Date of Patent: Oct. 5, 1999

[54] LC ALIGNING SUBSTRATE BY RUBBING THE SURFACE OF THE SUBSTRATE WITH A ROLLER WHILE SLIGHTLY VERTICALLY VIBRATING THE ROLLER AND THE SUBSTRATE

[75] Inventors: Mitsuru Ishibashi, Chiba; Hideyuki Sasaki; Tatsuo Nomaki, both of Kanagawa; Shigeki Terada; Hirofumi Ishii, both of Saitama, all of Japan

[73] Assignee: Kabushiki Kaisha Toshiba, Kawasaki, Japan

[21] Appl. No.: 09/000,567

[22] Filed: Dec. 30, 1997

[51] Int. Cl.⁶ .................................................. G02F 1/1337
[52] U.S. Cl. ........................................... 349/126; 349/191
[58] Field of Search ..................................... 349/126, 191

[56] References Cited

U.S. PATENT DOCUMENTS

| | | |
|---|---|---|
| 5,075,790 | 12/1991 | Hayashi et al. ............................ 359/76 |
| 5,221,981 | 6/1993 | Kodera et al. ............................. 359/76 |
| 5,406,397 | 4/1995 | Kodera et al. ............................. 359/76 |
| 5,422,750 | 6/1995 | Kodera et al. ............................. 359/76 |
| 5,668,615 | 9/1997 | Miyata ..................................... 349/126 |
| 5,676,779 | 10/1997 | Kim et al. ................................ 349/126 |
| 5,710,610 | 1/1998 | Kim ......................................... 349/126 |

*Primary Examiner*—William L. Sikes
*Assistant Examiner*—Tarifur R. Chowdhury
*Attorney, Agent, or Firm*—Foley & Lardner

[57] ABSTRACT

An LC aligning substrate (3) is used for an LCD. The substrate is rubbed with a roller (5). The roller has irregularities on the surface thereof, or instead, one of the roller and substrate is vertically vibrated. As a result, the orientation of molecules at the surface of the substrate is finely changed to conceal sharp changes in the orientation of the surface molecules, thereby preventing the LCD from displaying defective rubbing stripes.

6 Claims, 7 Drawing Sheets

FIG. 10B
PRIOR ART

LC ALIGNING SUBSTRATE BY RUBBING THE SURFACE OF THE SUBSTRATE WITH A ROLLER WHILE SLIGHTLY VERTICALLY VIBRATING THE ROLLER AND THE SUBSTRATE

BACKGROUND OF THE INVENTION

1. Field of the Invention

The present invention relates to an LC (liquid crystal) aligning substrate used for an LCD (liquid crystal display), and a method of forming the LC aligning substrate.

2. Description of the Prior Art

LCDs are widely used for notebook computers. The LCDs employ an LC aligning substrate to control the orientation of liquid crystals. Generally, the LC aligning substrate is formed by forming a transparent electrode such as an ITO (indium tin oxide) thin film on a glass substrate, depositing an LC aligning resin film such as a high-polymer polyimide film on the transparent electrode, and rubbing the surface of the LC aligning resin film in one direction with a rubbing cloth made of cotton or rayon to orient the vectors of surface molecules of the film in the direction.

Figure 9A:
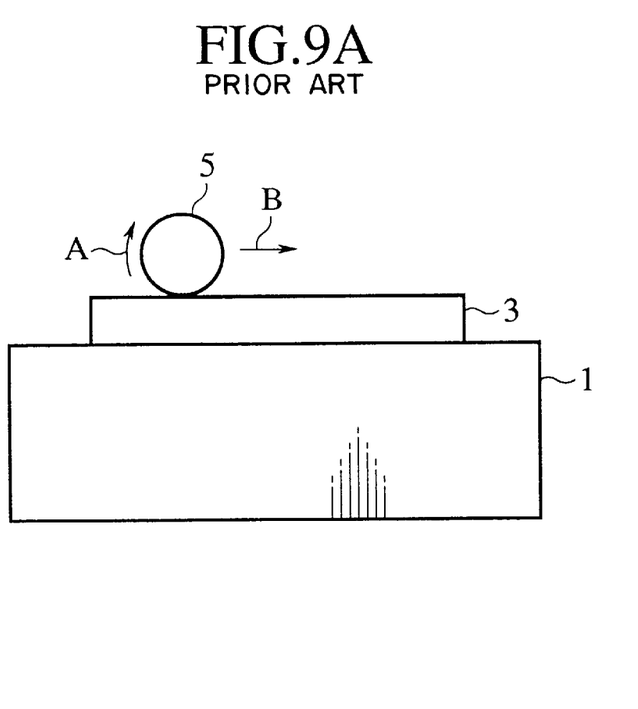
FIGS. 9A and 9B show an apparatus for rubbing an LC aligning substrate according to the prior art.
Figure 9B:
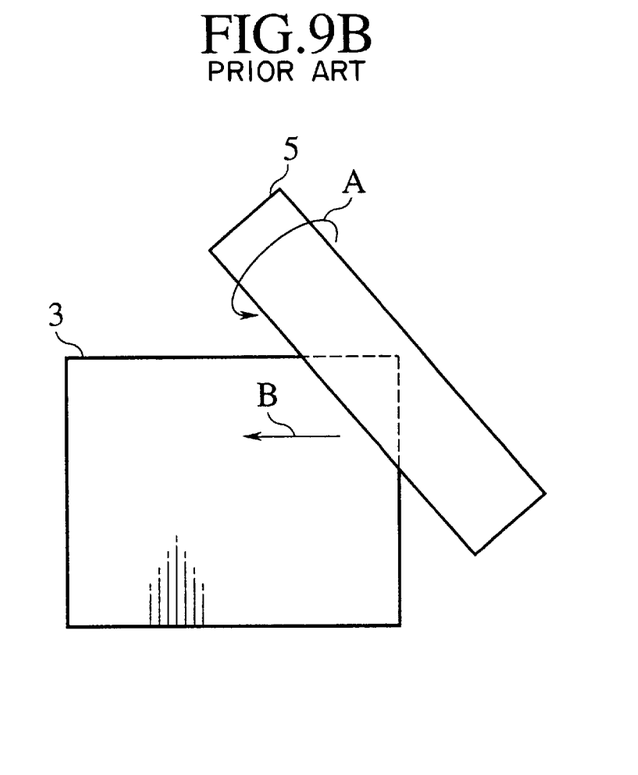

FIG. 9A is a vertical section showing an apparatus for rubbing the surface of such an LC aligning substrate, and FIG. 9B is a plan view showing the same. The LC aligning substrate 3 is fixed to a table 1. A roller 5 wound with a rubbing cloth is rotated at high speed in a direction A. The roller 5 is made contact with the surface of the substrate 3 and is moved in parallel with the substrate 3 in a direction B so that the surface molecules of LC aligning resin on the substrate 3 are oriented in a given direction. Although this example fixes the substrate 3 to the table 1 and moves the roller 5 in parallel with the substrate 3, it is possible to fix the roller 5 and move the substrate 3.

This prior art is suitable for mass production and is low cost, and therefore, most of LC aligning substrates are formed according to this prior art.

Although the rubbing process of the prior art is simple, it is very difficult for the prior art to optimize rubbing conditions. This is because the LC aligning performance of an LC aligning substrate greatly varies depending on LC aligning resin deposited on the substrate, the material of the rubbing cloth, the revolution and moving speeds of the roller, contact pressure between the roller and the substrate, etc. It is very difficult, therefore, to optimize these rubbing conditions.

Figure 10A:
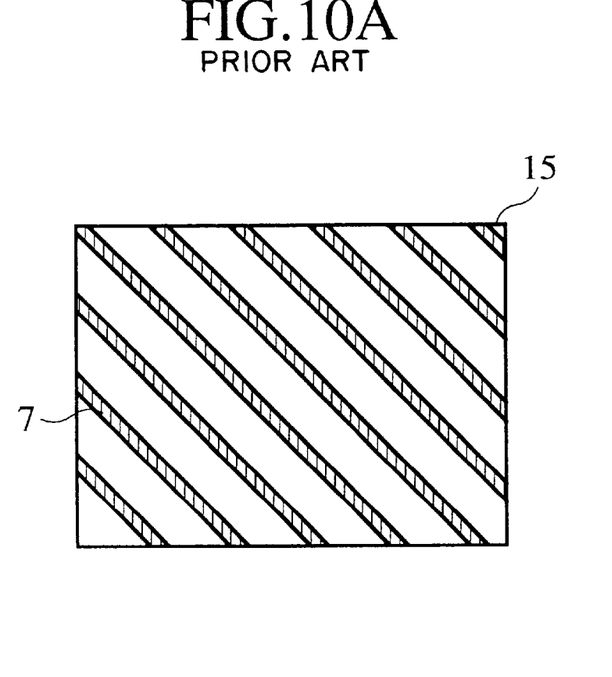
FIGS. 10A and 10B explain rubbing stripes produced on an LCD screen.
Figure 10B:
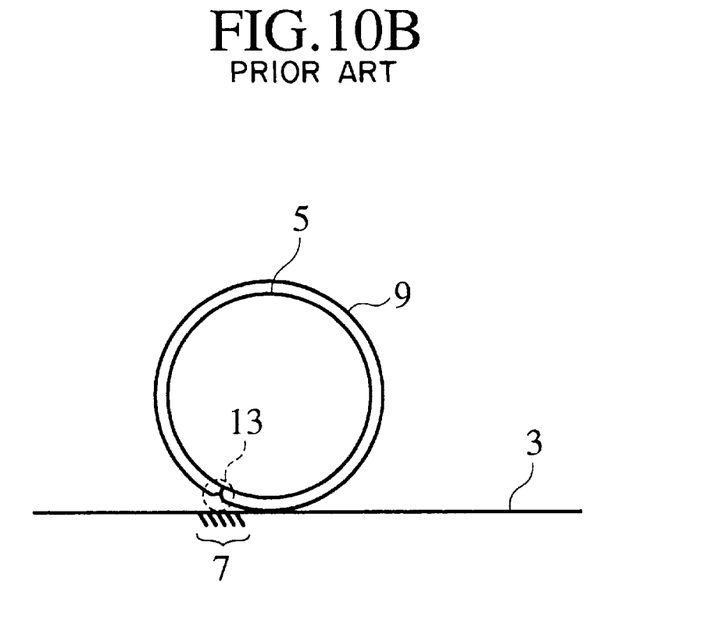

In addition, the prior art causes a defect called rubbing stripes shown in FIG. 10A. The rubbing stripes 7 appear at regular intervals on a screen when an LCD 15 is turned on. The stripes 7 are thought to be caused by defects on the roller, in particular, on the rubbing cloth because revolutions of the roller match with the intervals of the stripes 7. The defects on the rubbing cloth include a seam of the rubbing cloth and irregularities caused by double-side adhesive tapes attached between the roller and the rubbing cloth. According to our studies, the defects on the rubbing cloth locally and sharply change the orientation of surface molecules of LC aligning resin on the substrate, to affect the orientation of liquid crystals, thereby creating the stripes 7. FIG. 10B shows a seam 13 of a rubbing cloth 9 wound around a roller 5. The seam 13 may produce the stripes 7 of FIG. 10A on an LCD screen.

SUMMARY OF THE INVENTION

An object of the present invention is to provide an LC aligning substrate that causes no rubbing stripes on an LCD screen and a method of forming such an LC aligning substrate, capable of easily optimizing rubbing conditions.

In order to accomplish the object, a first aspect of the present invention provides a method of processing an LC aligning substrate, including the step of rubbing the surface of the LC aligning substrate with a roller having Irregularities on the surface thereof, to form irregularities on the surface of the LC aligning substrate.

The irregularities on the roller are arranged provided at heights of 0.05 mm to 0.5 mm and so that the irregularities formed (that is, provided a change in alignment or alignment variations) on the surface of the LC aligning substrate may have intervals of 0.1 mm to 5 mm.

A second aspect of the present invention provides a method of processing an LC aligning substrate, including the step of rubbing the surface of the LC aligning substrate with a roller while slightly vertically vibrating one of the roller and LC aligning substrate, to form irregularities on the surface of the LC aligning substrate.

One of the roller and LC aligning substrate is vibrated at heights of 0.05 mm to 0.5 mm so that the alignment variations on the surface of the LC aligning substrate may have intervals of 0.1 mm to 5 mm and heights of 0.05 mm to 0.5 mm.

A third aspect of the present invention provides an LC aligning substrate rubbed with a roller, having reflected infrared absorbance difference that shows periodic and successive changes of 0.0002 or over at intervals of 0.1 mm to 5.0 mm in a rubbing direction. The reflected infrared absorbance difference serves as an index of the orientation of surface molecules of the LC aligning substrate and is measured by emitting two polarized rays in and orthogonal to the rubbing direction toward the surface of the LC aligning substrate, detecting the absorbances of reflected infrared rays from the LC aligning substrate, and calculating the difference between the absorbances at the characteristic absorption wavelength of the LC aligning substrate.

In this way, the present invention microscopically and finely changes the orientation of surface molecules of the LC aligning substrate, to evenly distribute the influence of the surface changes of the LC aligning substrate to liquid crystals. This results in concealing local sharp changes in the orientation of surface molecules of the LC aligning substrate that may produce rubbing stripes on a screen. As a result, liquid crystals of an LCD that employs the LC aligning substrate of the present invention are free from the influence of local sharp changes in surface molecules of the LC aligning substrate, to thereby create no rubbing stripes on the screen thereof.

It is very difficult for the prior art to optimize rubbing conditions because the prior art tries to optimize rubbing conditions to orient the vectors of surface molecules of LC aligning resin on a substrate in a specific direction. On the other hand, the present invention greatly relaxes rubbing conditions by microscopically and finely changing the orientation of surface molecules of an LC aligning substrate. Namely, the present invention easily optimizes the rubbing conditions.

DETAILED DESCRIPTION OF THE EMBODIMENTS

Figure 1A:
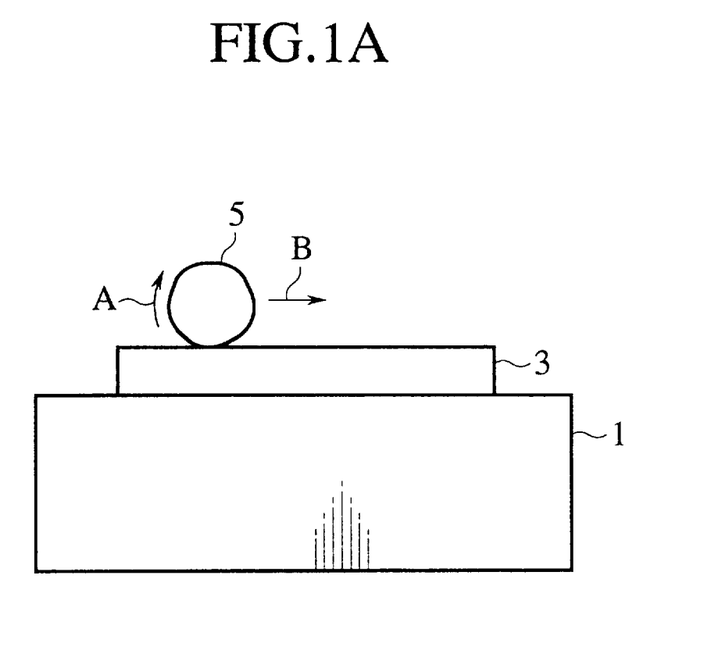
FIGS. 1A and 1B schematically show an apparatus for rubbing an LC aligning substrate according to a first embodiment of the present invention.
Figure 1B:
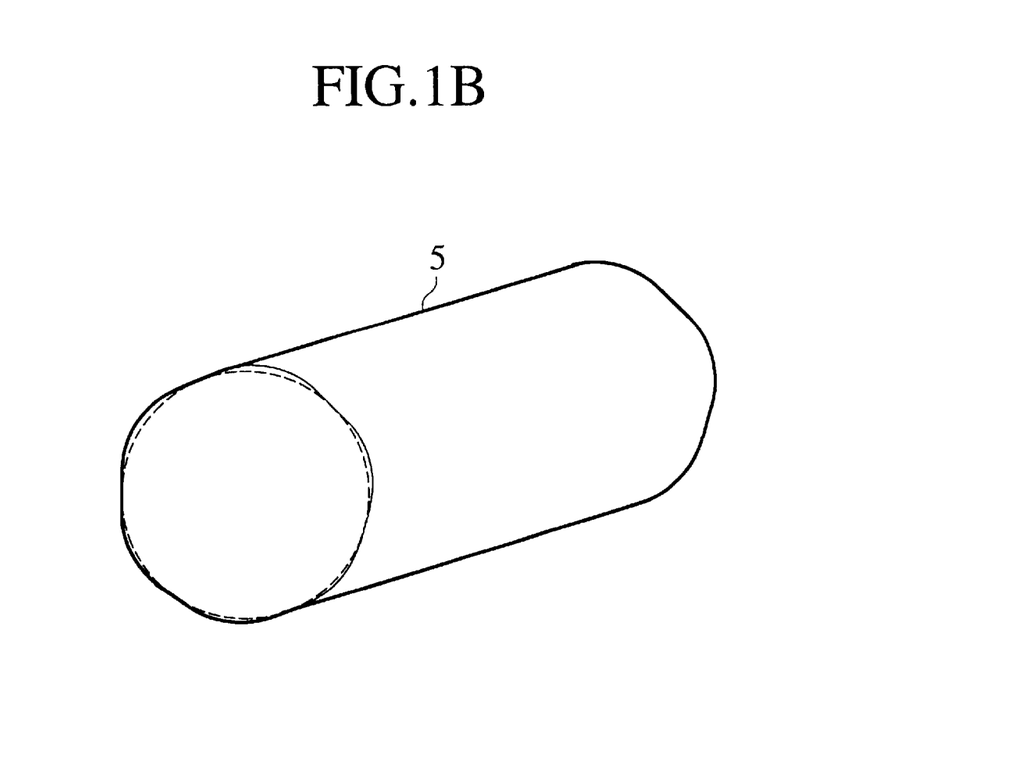

The embodiments of the present invention will be explained with reference to the drawings. FIG. 1A is a vertical section schematically showing an apparatus for rubbing an LC aligning substrate according to the first embodiment of the present invention, and FIG. 1B is an enlarged view showing a roller according to the first embodiment. A dotted line in FIG. 1B shows the shape of a conventional roller. The same parts as those of the prior art are represented with the same reference marks.

An LC aligning substrate 3 is fixed to a table 1. A roller 5 is wound with a rubbing cloth and is rotated at high speed in a direction A. The roller 5 is made contact with the surface of the substrate 3 and is moved in a direction B in parallel with the substrate 3, to rub the surface of the substrate 3 and orient the molecules of an LC aligning resin film deposited on the substrate 3.

The first embodiment differs from the prior art in that the roller 5 has axial irregularities as shown in FIG. 1B. When the roller 5 is rotated, the distance between the roller 5 and the LC aligning substrate 3 changes according to a sinusoidal function. This results in microscopically and finely changing the orientation of surface molecules of the LC aligning resin on the substrate 3, to prevent rubbing stripes from being displayed on an LCD that employs the substrate 3. Microscopically and finely changing the surface molecules of the substrate 3 averages the influence of the orientation of the surface molecules of the substrate 3 on liquid crystals of the LCD. Namely, the orientation of the liquid crystals is not affected by local variations in the orientation of the surface molecules of the substrate 3. More precisely, sharp changes in the orientation of the surface molecules of the substrate 3 that may create the rubbing stripes on the LCD disappear apparently. It is very difficult for the prior art to optimize the rubbing conditions of an LC aligning substrate because the prior art tries to optimize the rubbing conditions to orient the vectors of surface molecules of the substrate in one direction. On the other hand, the present invention easily and stably optimizes the rubbing conditions of an LC aligning substrate because the present invention relaxes the rubbing conditions by microscopically and finely changing the orientation of surface molecules of the substrate.

In FIG. 1, the roller 5 may have a diameter of 150 mm and be driven at a revolution speed of 1000 rpm and a moving speed of 200 mm/sec. The irregularities on the roller 5 may have intervals of 60 degrees in rotation angle and a height of 0.2 mm. Variations in alignment formed on the surface of the LC aligning substrate 3 are dependent on the moving speed, revolution speed, and diameter of the roller 5, and it is preferably provided at intervals of 0.1 mm to 5 mm and the irregularities on the roller 5 preferably have heights of 0.05 mm to 0.5 mm.

Figure 2:
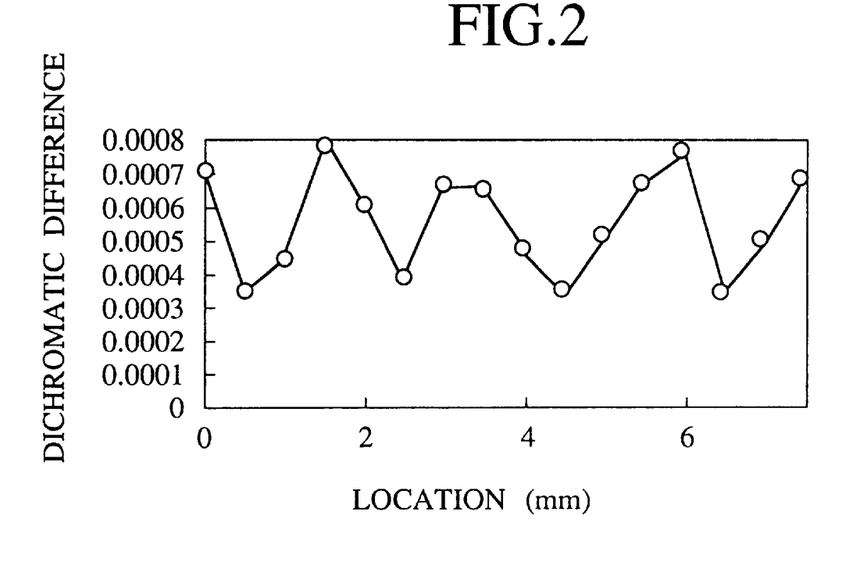
FIG. 2 is a graph showing dichromatic difference measured on the LC aligning substrate of the first embodiment at intervals of 0.5 mm in a roller moving direction.
Figure 3:
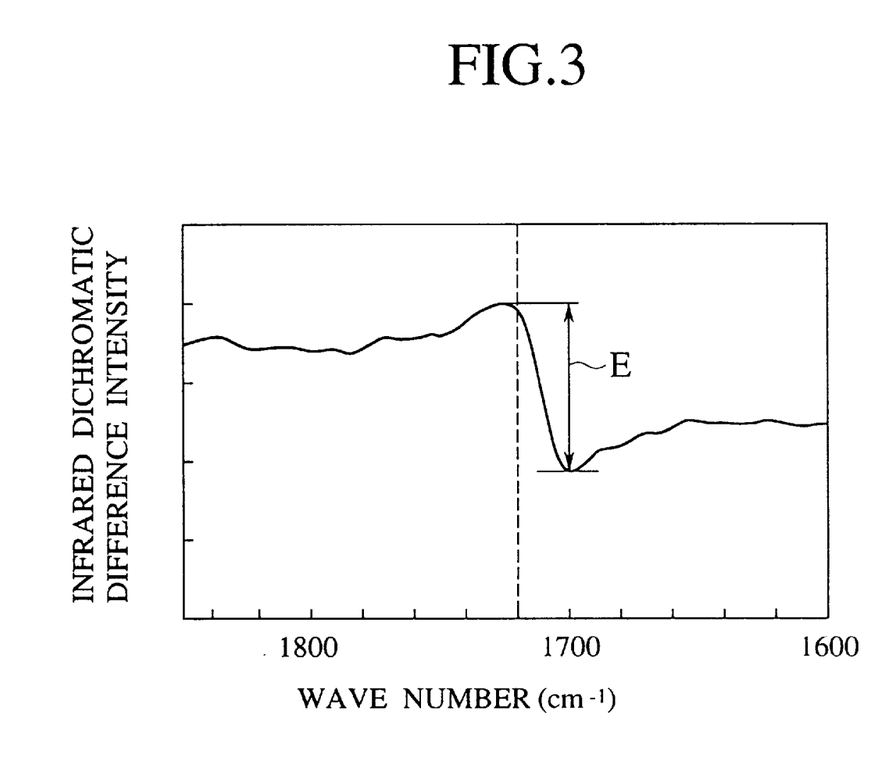
FIG. 3 is a graph showing a method of evaluating an LC aligning substrate.

Evaluation on the orientation of surface molecules of the LC aligning substrate of the first embodiment will be explained. The inventors of the present invention proposed, in Japanese Patent Application No. 6-219087, an evaluation technique of an LC aligning substrate. This technique emits two polarized rays in and orthogonal to a rubbing direction toward the surface of the LC aligning substrate, detects the absorption spectra of reflected infrared rays from the substrate, and calculates the difference spectrum between the two spectra. The difference spectrum shows an absorption peak of coupling of C=O around 1720 cm−1. This peak intensity at the difference spectrum is used as a dichromatic difference to evaluate molecular orientation. FIG. 2 is a graph showing dichromatic difference measured on the LC aligning substrate of the first embodiment at intervals of 0.5 mm in a roller moving direction. The dichromatic difference successively and periodically changes in the roller moving direction at intervals of about 2 mm within the amplitude of about 0.0004. In FIG. 3, reflection spectra show a differential peak. In this case, the difference E between maximal and minimal peaks is used as a peak intensity. The inventors made an LCD with the LC aligning substrate having the characteristics of FIG. 2 and confirmed that the LCD displayed no rubbing stripes.

Figure 4:
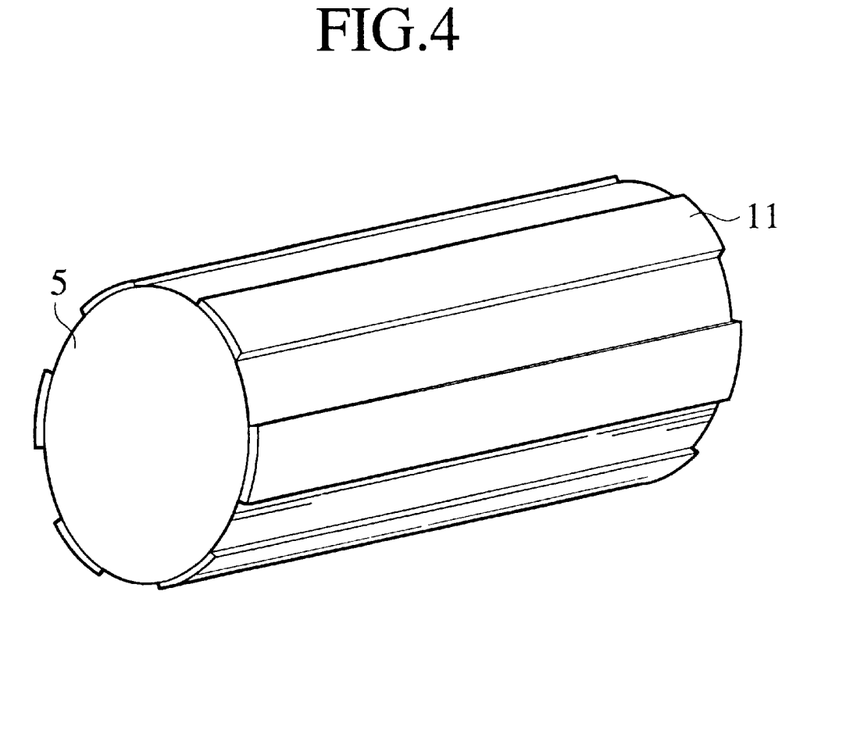
FIG. 4 shows a roller for rubbing an LC aligning substrate according to a second embodiment of the present invention.

The second embodiment will be explained. FIG. 4 shows a roller 5 for rubbing an LC aligning substrate according to the second embodiment. Double-side adhesive tapes 11 are attached to the periphery of the roller 5 at regular intervals, so that a rubbing cloth to be wound around the roller 5 may have irregularities.

For example, the roller 5 has a diameter of 150 mm, and each of the tapes 11 has a thickness of 0.5 mm and a width of 40 mm. The tapes 11 are attached in parallel with one another to the roller 5 at intervals of about 40 mm. A rubbing cloth is attached to the tapes 11 so that the rubbing cloth may have irregularities at intervals of 60 degrees in rotation angle of the roller 5. The roller 5 is driven at a revolution speed of 1000 rpm and a moving speed of 200 mm/sec.

Figure 5:
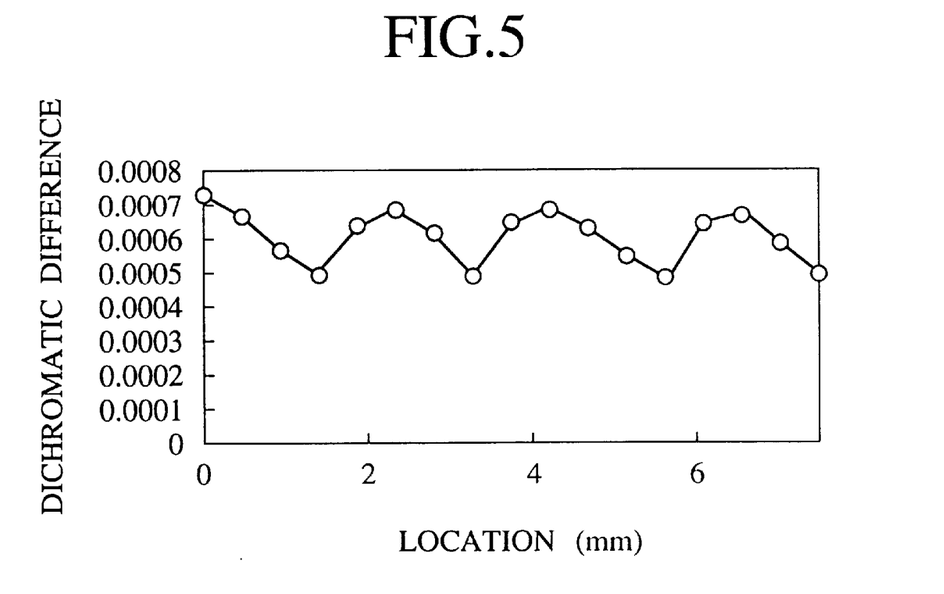
FIG. 5 is a graph showing dichromatic difference measured on the LC aligning substrate of the second embodiment at intervals of 0.5 mm in a roller moving direction.

The inventors rubbed an LC aligning substrate with the roller 5 mentioned above and evaluated the substrate similar to the first embodiment. FIG. 5 shows a result of the evaluation. Dichromatic difference periodically and successively changes in a roller moving direction at intervals of about 2 mm within the amplitude of about 0.0002. The inventors made an LCD with the LC aligning substrate having the characteristics of FIG. 4 and confirmed that the LCD displayed no rubbing stripes.

Figure 6:
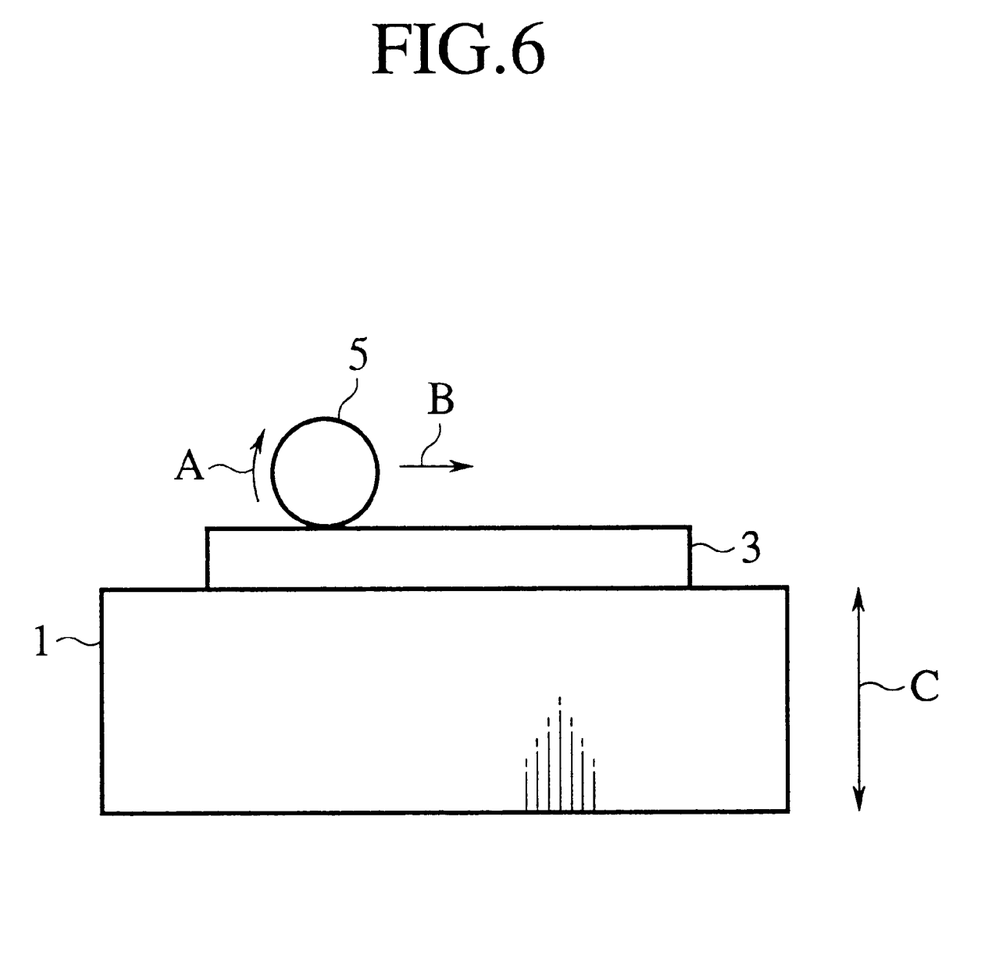
FIG. 6 shows an apparatus for rubbing an LC aligning substrate according to a third embodiment of the present invention.

The third embodiment will be explained. FIG. 6 shows an apparatus for rubbing an LC aligning substrate according to the third embodiment. The substrate 3 is supported by a table 1, which is kept at a horizontal posture and is vertically vibrated in a direction C. This provides the same effect as the first and second embodiments on the substrate.

For example, the table 1 is vertically vibrated at a frequency of 100 Hz and an amplitude of 0.2 mm so that the vibration may provide a sinusoidal waveform. An optimum vibration frequency of the table 1 is dependent on the moving speed of a roller 5. It is preferable to determine the vibration frequency of the table 1 so that the surface of the substrate 3 may have a change in alignment variation of, 0.1 mm to 5 mm in interval with a vibration height of 0.05 mm to 0.5 mm. The roller 5 is driven at, for example, a revolution speed of 1000 rpm and a moving speed of 200 mm/sec.

Figure 7:
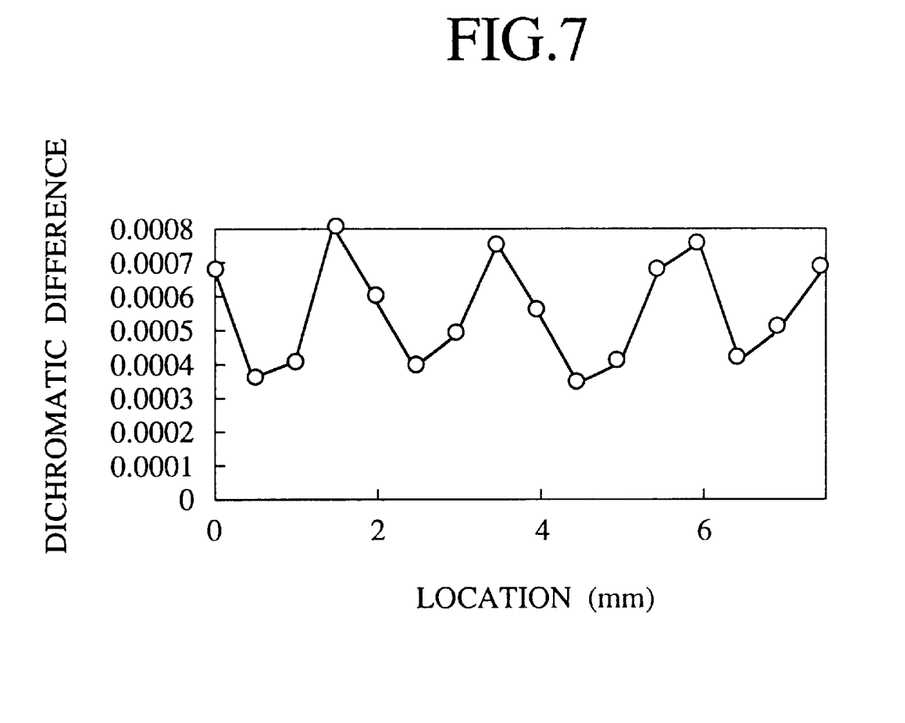
FIG. 7 is a graph showing dichromatic difference measured on the LC aligning substrate of the third embodiment at intervals of 0.5 mm in a roller moving direction.

The inventors rubbed an LC aligning substrate according to the third embodiment and evaluated the substrate. FIG. 7 shows a result of the evaluation. Dichromatic difference periodically and successively changes in a roller moving direction at intervals of about 2 mm within the amplitude of about 0.0004. The inventors made an LCD with the LC aligning substrate having the characteristics of FIG. 7 and confirmed that the LCD displayed no rubbing stripes.

Figure 8:
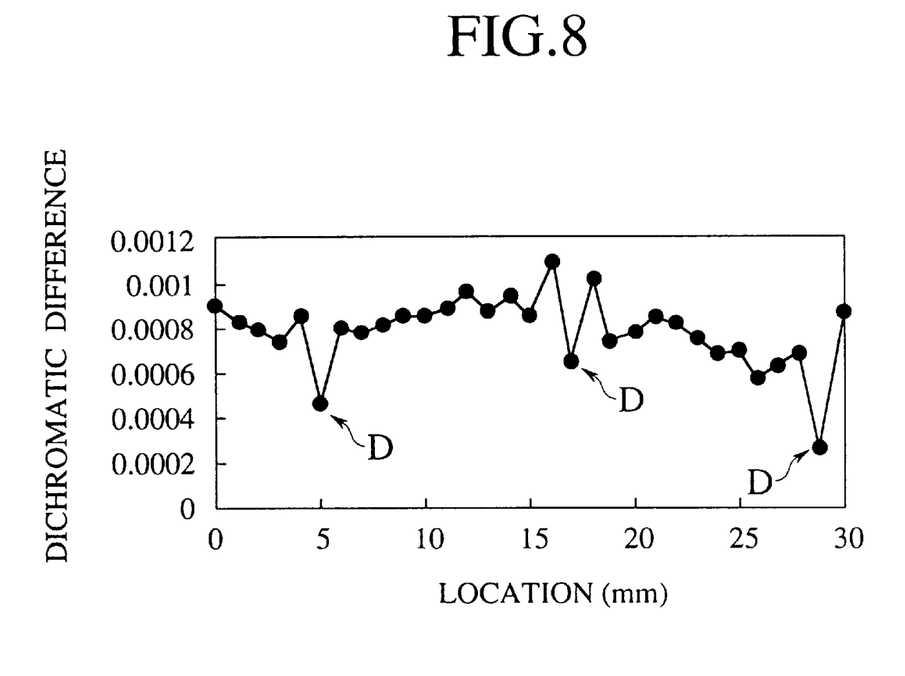
FIG. 8 is a graph showing dichromatic difference measured on an LC aligning substrate of a prior art at regular intervals in a roller moving direction.

The inventors also tested the prior art. A rubbing cloth was attached around a roller tightly with a double-side adhesive tape so that no irregularities were formed on the rubbing cloth. The roller was used to rub an LC aligning substrate according to the prior art. FIG. 8 shows a result of evaluation on the surface molecules of the tested LC aligning substrate of the prior art. Dichromatic difference periodically and locally shows sudden abnormalities "D" among stable values. The inventors made an LCD with the LC aligning substrate having the characteristics of FIG. 8 and confirmed that the LCD displayed rubbing stripes whose intervals agreed with the intervals of the dichromatic difference abnormalities "D" of FIG. 8.

As explained above, the present invention provides an LC aligning substrate that creates no rubbing stripes on a screen when it is used for an LCD.

The present invention relaxes rubbing conditions for LC aligning substrates and easily optimizes the rubbing conditions.

Various modifications will become possible for those skilled in the art after receiving the teachings of the present disclosure without departing from the scope thereof.

What is claimed is:

1. A method processing an LC aligning substrate, comprising the step of:

rubbing the surface of the LC aligning substrate with a roller having irregularities on the surface thereof, to provide alignment variation on the surface of the LC aligning substrate, wherein the irregularities on the roller are provided at heights of 0.05 mm to 0.5 mm and arranged so that the alignment variation on the surface of the LC aligning substrate is reccurent at cycles of 0.1 mm to 5.0 mm.

2. The method of claim 1, wherein the irregularities on the roller are arranged so that the irregularities formed on the surface of the LC aligning substrate have intervals of 0.1 mm to 5.0 mm and heights of 0.05 mm to 0.5 mm.

3. A method of processing an LC aligning substrate, comprising the step of:

rubbing the surface of the LC aligning substrate with a roller while slightly vertically vibrating one of the roller and LC aligning substrate, to provide alignment variation on the surface of the LC aligning substrate.

4. The method of claim 3, wherein one of the roller and LC aligning substrate is vibrated at heights of 0.05 mm to 0.5 mm so that the alignment variation on the surface of the LC aligning substrate is reccurent at cycles of 0.1 mm to 5.0 mm.

5. An LC aligning substrate rubbed with a roller, comprising reflected infrared absorbance difference that shows periodic and successive changes of 0.0002 or over at intervals of 0.1 mm to 5.0 mm in a rubbing direction, the reflected infrared absorbance difference serving as an index of the orientation of surface molecules of the LC aligning substrate and being measured by emitting two polarized rays in and orthogonal to the rubbing direction toward the surface of the LC aligning substrate, detecting the absorbances of reflected infrared rays from the LC aligning substrate, and calculating the difference between the absorbances at the characteristic absorption wavelength of the LC aligning substrate.

6. A method of processing an LC aligning substrate, comprising:

rubbing the surface of the LC aligning substrate with a roller having irregularities on the surface thereof, to form irregularities on the surface of the LC aligning substrate, wherein the irregularities on the roller are provided at heights of 0.05 mm to 0.5 mm and arranged so that the irregularities on the surface of the LC aligning substrate are reccurent at cycles of 0.1 mm to 5.0 mm.

* * * * *